April 18, 1939. E. R. SNAVELY 2,155,154
THERMAL FLUID MIXING VALVE
Filed May 10, 1935
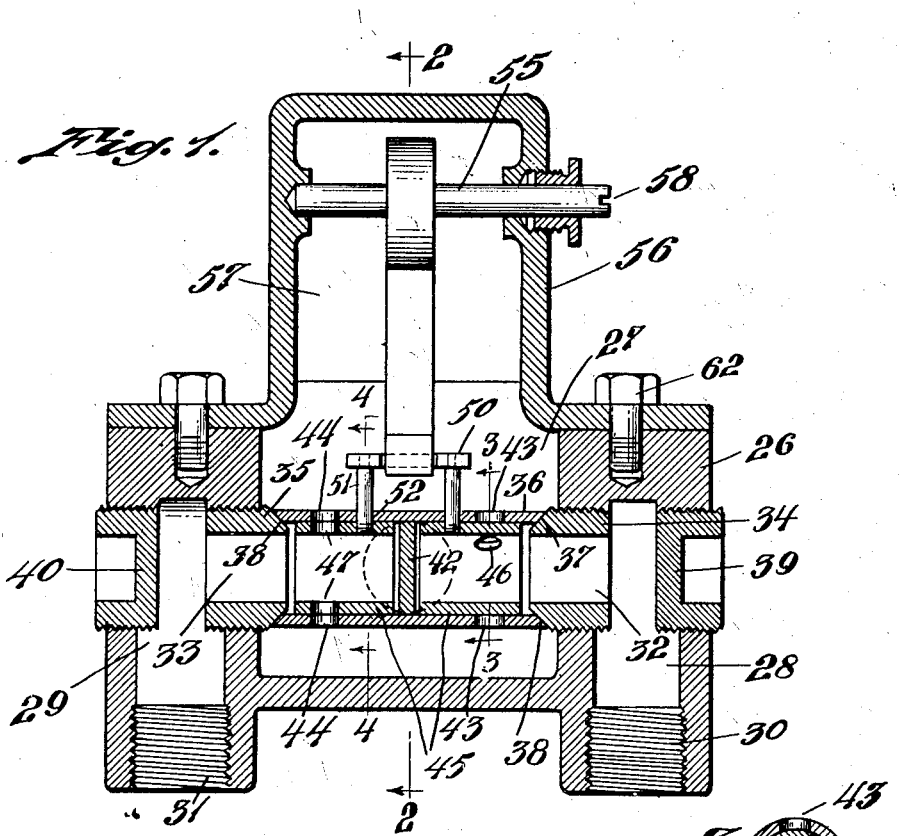
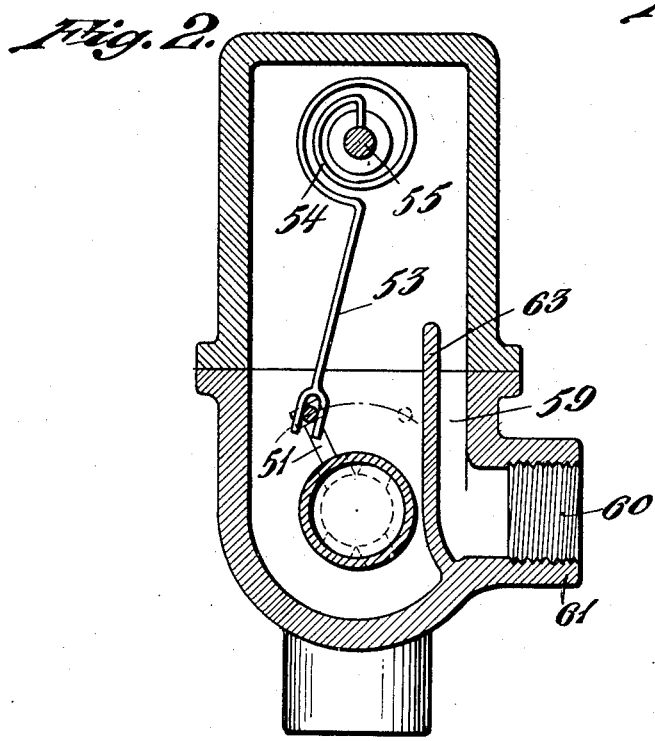
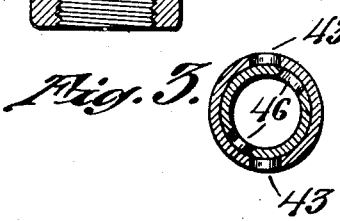
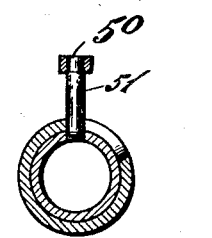
INVENTOR.
Earl R. Snavely
BY Barlow & Barlow
ATTORNEYS.

Patented Apr. 18, 1939

2,155,154

UNITED STATES PATENT OFFICE 2,155,154

THERMAL FLUID MIXING VALVE

Earl R. Snavely, Riverview, R. I., assignor to Evelyn L. Snavely, Newark, N. J.

Application May 10, 1935, Serial No. 20,772

5 Claims. (Cl. 236—12)

This invention relates to a thermal fluid mixing valve; and has for one of its objects the provision of a valve for mixing hot and cold liquids, primarily water, for the obtaining of a supply of water which is of a fairly constant temperature.

Another object of the invention is the simplification of the casing casting which houses the moving parts and which is shaped to cooperate therewith.

Another object of the invention is the provision of a valve having pipe lines which are connected thereto for the inflow of liquids having two different temperatures and an outflow of the resultant thereof, the arrangement being such that there is accessibility to the moving parts without disconnection of the inflow and outflow conduits for these admixed liquids.

Another object of the invention is the provision of a simple construction and a balanced relation flow of fluid, whereby an inexpensive and yet efficient and well working mixing valve can be had.

Another object of the invention is to conduct liquids of different temperatures toward each other with a single moving unit controlling the opening area thru which the fluid passes in both of the conduits.

Another object of the invention is the utilization of standard tubular parts of such sizes that they will fit sufficiently close one with the other so that the minimum operations of machine or tools need be performed in the formation of these different parts of the construction.

With these and other objects in view, the invention consists of certain novel features of construction, as will be more fully described, and particularly pointed out in the appended claims.

In the accompanying drawing:

Fig. 1 is a sectional view somewhat diagrammatic of a casing and the working parts therein;

Fig. 2 is a sectional view on substantially line 2—2 of Fig. 1;

Fig. 3 is a sectional view on line 3—3 of Fig. 1; and

Fig. 4 is a sectional view on line 4—4 of Fig. 1.

With reference to the drawing, and more particularly to Fig. 1, 26 designates the base of the casing, which is provided with a hollow portion 27 forming a part of the mixing chamber; while there are lead-in passages 28 and 29 into which hot and cold water supply pipes may be threaded as at 30 and 31. These conduits 28 and 29 are usually at right angles to the axially aligned conduits 32 and 33 in which mounting thimbles 34 and 35 are located for supporting a cylindrical tube 36 by means of the conical engaging surfaces 37 on the end of the tube and 38 on the ends of the thimbles 34 and 35. These thimbles are accessible thru plugs 39 and 40 also in axial alignment with the thimbles and thru which entrance may be gained by the passages 28 and 29. In this manner the entrance fluid of different temperatures is received in the ends of the conduits 32 and 33, which entrance is distant from the mixing chamber 27 and this fluid is conveyed inwardly in opposite directions towards each other. A dividing wall 42 prevents the mixing of the fluid of different temperatures within the tube 36, while the openings 43 and 44 permit the fluid to be discharged thru the ports or openings provided in the side walls of the tube 36.

In order to control these discharge openings or ports, I have provided a valve means comprising a rotary cylindrical member 45 which is provided with diametrically opposite openings 46 and 47 which in certain positions of rotation register with either the opening 43 or 44 in the tube 36. The arrangement of these openings is such that when the openings 44 and 47 are in registry the openings 43 and 46 will be out of registry and closed and conversely when the openings 43 and 46 are in registry the openings 44 and 47 will be out of registry and closed. The arrangement of these openings is such that as one pair of openings are gradually brought into registry the other pair of openings move gradually out of registry so that the movement inversely controls the flow area.

The two cylinders which form the valve means are connected together by a bridge 50 with posts 51 extending thru slots 52 in the tube 36 and threaded into the members 45. This bridge is engaged by a pendulum arm 53 of the thermostatic bi-metal which is spirally arranged as at 54 and mounted upon a shaft 55 supported in the casing 56 having a hollow portion 57 to complete the mixing chamber of the device. This arm 53 may be rotated by means of the slotted end 58 for adjustment of the spiral coil which causes different thermostatic temperatures to be maintained in the mixing chamber. This mixing chamber is discharged thru the passage 59 formed by a baffle plate 63 and openings 60 thru the part 61 to which a pipe may be permanently connected for this purpose.

The arrangement of this casing is such that by removal of the top 56 the plugs 39 and 40 and thimbles 34 and 35, the entire mechanism can be removed from the casing without disturbance of the pipe line connected at 30, 31 and 60 for supplying water to or taking water from the thermostatic valve. Of course, suitable bolts 62 may be used for holding the parts together.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a thermal fluid mixing valve, a casing having a mixing chamber, a tube in said casing having openings at its opposite ends and an imperforate plug between its ends forming two different conduits for different temperature liquids, ports thru the side of said tube in each conduit communicating with said chamber for discharge of liquid into said chamber, tandem valve means fitting within said tube, one being arranged in each conduit thereof, said valve means being rotatably movable in unison relative to said conduits to inversely vary the flow therethru, and thermostatic means in said mixing chamber and having its free end connected to said valve means outside of said conduits and arranged for movement thereabout for moving said valve means in response to changes in fluid temperatures.

2. In a thermal fluid mixing valve, a casing having in one portion a mixing chamber and in another portion axially aligned conduits for different temperature liquids with receiving openings distal from said chamber and discharging into said chamber, a dividing wall in said conduits comprising an imperforate central plug, valve means in said conduits comprising sleeve portions extending in opposite directions from said plug with ports in said sleeve portions, and thermostatic means for moving said valve means to position said ports at different relative positions with reference to said conduits to control the openings thru said ports.

3. In a thermal fluid mixing valve, a casing having in one portion a mixing chamber and in another portion axially aligned conduits for different temperature liquids with receiving openings distal from said chamber and discharge ports and discharging into said chamber, a dividing wall in said conduits comprising an imperforate central plug, rotatable valve means in said conduits comprising sleeve portions extending in opposite directions from said plug with ports in said sleeve portions, and thermostatic means for rotatably moving said valve means to position said valve ports at different relative positions with reference to said discharge ports to control the discharge of said liquid.

4. In a thermal fluid mixing valve, a casing having a mixing chamber therein, two axially aligned conduits for different temperature liquids having receiving openings distal from said chamber and discharge openings into said chamber, an imperforate dividing wall separating said conduits, unit valve means comprising two valve sleeves fitting within and extending along said conduits in opposite directions from said wall and rotatable relative to the conduits for inversely controlling the flow through said conduits, ports in said valve sleeves, means disposed at opposite sides of said dividing wall connecting said valve sleeves together for operating the same in unison, and thermostatic means in said chamber connected to said valve sleeve connecting means outside of said conduits and arranged for movement thereabout for moving said valve connecting means and said valve sleeves in response to changes in fluid temperatures.

5. In a thermal fluid mixing valve, a casing having a mixing chamber, a tube in said casing supported at its ends and extending across said mixing chamber, said tube having openings at its opposite ends and a continuous bore therethrough, a dividing wall in said bore consisting of a plug between the ends of the bore forming different conduits within said tube for different temperature liquids, ports through the side of said tube in each conduit communicating with said chamber for discharge of liquid into said chamber, valve means fitting within each of said conduit portions of said tube and movable relative thereto for controlling said conduits to inversely vary the flow therethrough, means external of said tube extending interiorly thereof adapted for rotary movement about the axis of the tube through openings in the side of the tube connecting together said valve means in each of said conduits for movement in unison, and thermostatic means in said mixing chamber offset from the axis of said valve means for moving said valve means and said connector means therefor in response to changes in fluid temperatures.

EARL R. SNAVELY.